United States Patent [19]

Shirako et al.

[11] 4,293,885
[45] Oct. 6, 1981

[54] PAD SPRING FOR A TAPE CASSETTE

[76] Inventors: Hideo Shirako, Olympus Apartment House 146, No. 7-14-11, Owada-Cho, Hachioji City, Tokyo; Shoichi Saito, No. 2-49-13,, Minami-dai, Nakano-ku, Tokyo, both of Japan

[21] Appl. No.: 85,304

[22] Filed: Oct. 16, 1979

[51] Int. Cl.$^3$ .............................................. G11B 15/60
[52] U.S. Cl. .............................. 360/130.33; 267/158; 360/132
[58] Field of Search ....................... 267/158, 159, 164; 188/83; 360/130.2, 130.31, 130.32, 130.33, 132

[56] References Cited

U.S. PATENT DOCUMENTS 3,751,043  8/1973  Bracci .................................. 360/132
3,940,799  2/1976  Matsumoto et al. ................. 360/132
4,087,845  5/1978  Saito .............................. 360/130.33

Primary Examiner—Edward R. Kazenske
Attorney, Agent, or Firm—Toren, McGeady and Stanger

[57] ABSTRACT

A pad spring for use in a tape cassette is disclosed. The pad spring comprises a bent center section engaged with a pad supporting portion. Free end sections extend from the center section towards both side directions, respectively, are attached to the free end sections, and projections forming a working fulcrum for the pad spring are provided at the rear side of the pad attaching surface of the free end sections, respectively. The bent center section has a narrow portion extending between the pad supporting portion and a fulcrum of the bent center section.

3 Claims, 14 Drawing Figures

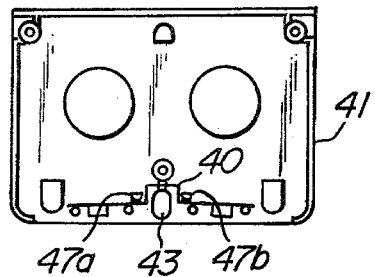
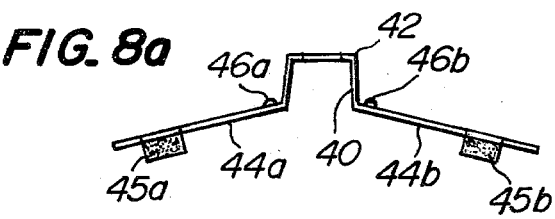
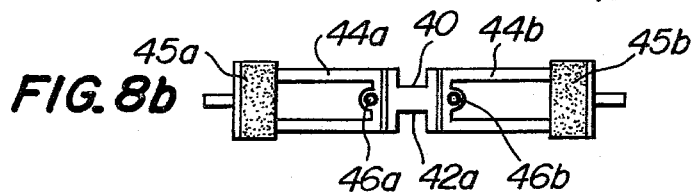
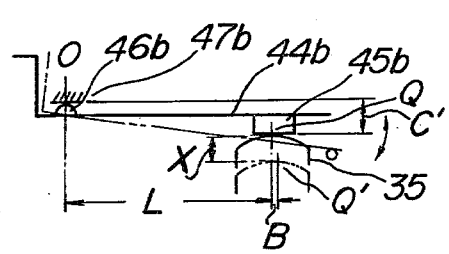
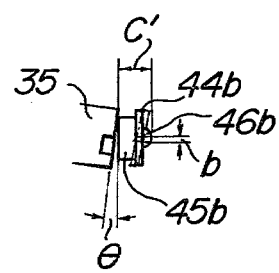

PAD SPRING FOR A TAPE CASSETTE

BACKGROUND OF THE INVENTION

The present invention relates to a pad spring for use in a tape cassette.

A pad supporting spring for use in a tape cassette is, as well known, formed with a leaf. The pad supporting spring is arranged in the rear of a magnetic tape extended in the cassette along a window hole provided in front of the tape cassette, and serves to press the extended tape, by way of the pad, to the surface of a magnetic head which extends into the cassette from the window hole.

One embodiment of the pad spring previously used will be explained with reference to FIGS. 1 and 2. FIG. 1 is a plan view of a cassette half 2 with a pad spring 1 mounted thereon. The cassette half 2 is a half portion of a tape cassette known as a microcassette (trade name), and provided is with tape hubs 3 and 4 rotatably arranged on both sides thereof, a tape T being wound around the hubs 3,4.

The pad spring 1 is arranged in the rear of the tape T, aligned in the direction of tape feed between the windings. The pad spring 1 is composed of a very thin leaf spring and its surface is arranged in parallel to the tape surface of the feeding tape T. At the center portion 1a of the leaf spring 1 are projecting hemispherical convex portions 1a, 1b providing a (working) fulcrum for the spring toward the inside of the cassette. These convex portions 1a, 1b are made to contact a fulcrum supporting member 7 integrally provided in the cassette half 2.

Both free ends 1e, 1f of spring 1 extend in a bifurcated manner from the spring center portion, and pads 8,9 are respectively attached to these free ends. A capstan inserting hole is also provided in cassette half 2.

The pad spring 1 thus constructed presses the pads 8, 9 against the tape when a magnetic head (not shown) is inserted, and the tape is brought into contact with the head surface. Therefore, the tape is suitably brought into contact with the head surface through the pads through an inserting force of the head and a resilient force of the pad spring 1.

However, the magnetic head does not always move horizontally when it enters into the cassette, but as shown in FIG. 3, the magnetic head 14 is sometimes inclined when it enters into the cassette.

In this case, since the center portion having the hemispherical convex portion as the fulcrum of the pad spring, is connected to the pad supporting portion by means of two free ends, the free ends are wider than the center portion. As a result, they are not smoothly brought into contact with each other when contacting to the head and it is impossible to contact the tape with the head under the best condition.

Particularly, in case of using both pads at the same time, a twist of one pad has an influence upon the other pad, so that any rigidity of the free end of the spring is a problem which should be minimized, otherwise good recording and reproduction cannot be carried out.

The construction and the operation of this pad spring are further described in detail in FIGS. 6a–6d.

The pad spring 31, as shown in FIGS. 6a and 6b, is provided at its center with two projections 32a, 32b as its working fulcrum and with pads 34a, 34b attached to free ends 33a, 33b extended from the bent center portion.

The thus constructed pad spring 31, as shown in FIG. 6c, is shifted from the positions (shown by two dots-dash line) of the pad 34b and the free end 33b before being brought into contact with a magnetic head 35, to a portion P' of the head 35 being brought into contact with the pad 34b and to a position P of the head 35 being brought into contact with the pad 34b at a distance X completely entered in the cassette by A. Let a distance from a fulcrum supporting portion 36 made into contact with the convex portion 32b as a working fulcrum of the pad spring 31 to a position P completely made into contact the pad 34b with the head 35 C, and let a distance from the convex 32b to the point P L, the smaller the distances A, C changed by the movement, the better the pad and the head are matched with each other, and as a result, good recording and reproduction can be obtained.

Therefore, it is desired to make a displacement amount at the time of contacting the pad with the head very small in design.

SUMMARY OF THE INVENTION

An object of the present invention is to solve the above described problems.

Another object of the present invention is to provide a pad spring for use in a tape cassette which can contact a tape under the best condition for carrying out excellent recording and reproduction even if the head is inserted in the cassette under any condition.

A further object of the present invention is to provide a pad spring for use in a tape cassette, which can satisfy the above demand, lessen a displacement amount, improve smoothness of a pad with a magnetic head, and carry out preferable recording and reproduction.

According to the present invention a pad spring provided in a tape cassette having a magnetic tape therein, for pressing the tape to a magnetic head, comprises a bent center section engaged to a pad supporting member, free end sections extended from the center section towards both side directions, respectively, and pads attached to the free end sections. Projections as a working fulcrum of the pad spring are provided at the rear side of a pad attaching surface of the free end sections respectively. A portion between a pad supporting portion and a fulcrum of the bent center section is made narrow.

BRIEF DESCRIPTION OF THE DRAWING

FIG. 7 is a plan view showing a cassette half portion with a pad spring according to the present invention;

FIGS. 8a and 8b are a side view and a front view showing another embodiment of a pad spring according to the present invention; and FIGS. 9 and 10 are views for explaining an operation of the pad spring shown in FIG. 8.

DESCRIPTION OF THE PREFERRED EMBODIMENT

Figure 4:
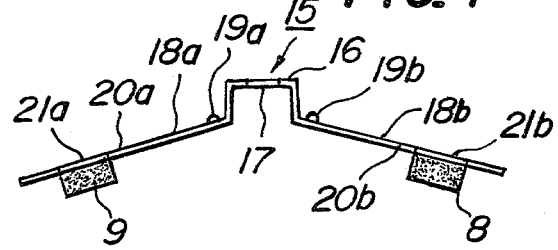
FIG. 4 is a side view showing one embodiment of a pad spring according to the present invention.
Figure 5:
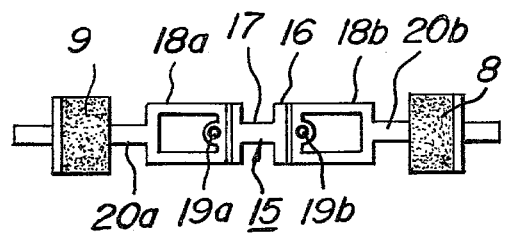
FIG. 5 is a front view of the pad spring shown in FIG. 4.

Referring to FIGS. 4 and 5 one embodiment of a pad spring according to the present invention will be explained.

A pad spring 15 is bent toward the inside of a cassette at a center portion 16 as shown in FIGS. 4 and 5, the center of the portion 16 is formed with a narrow coupling portion 17, and from the coupling portion 17 are formed middle portions 18a, 18b formed into a square frame shape, respectively.

In the vicinity of the base portion of the above middle portions 18a, 18b, i.e., the middle portions 18a, 18b extended to both sides, are provided convex portions i.e., projections 19a, 19b as a working fulcrum toward the inside of the cassette, respectively. Further, on the ends of the middle portions 18a, 18b, i.e., the opposite sides of the convex portions 19a, 19b, are provided narrow free ends 20a, 20b, and pads 8, 9 are adhered to pad spring adhering portions 21a, 21b provided at the middle portions of the free ends 20a, 20b.

Figure 1:
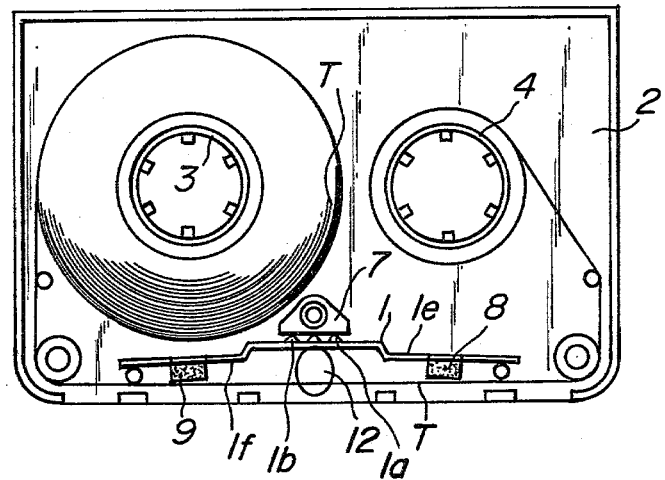
FIG. 1 is a plan view of a cassette half portion provided with a conventional pad spring.
Figure 2:
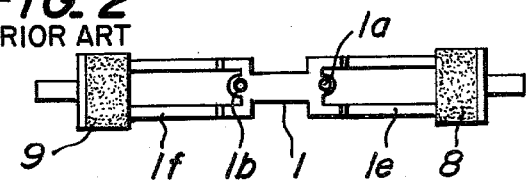
FIG. 2 is a front view of the conventional pad spring.
Figure 3:
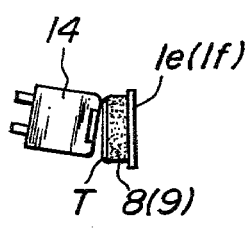
FIG. 3 is a schematic end view showing the state of obliquely contacting the pad with the magnetic head.

According to the pad spring 15 thus constructed, the free ends 20a, 20b are formed into a considerably narrow shape, so that even if the head 14 is inclined as shown in FIG. 3, since the rigidity at the connecting portion of the middle portions 18a, 18b and the free ends 20a, 20b is made small, the inclination of the head 14 and the pads 8, 9 is absorbed at that portion, the contact of the pads 8, 9 to the head 14 is made smooth, and a very good head touch can be obtained.

The pad spring thus formed, two pads are particularly effective when each head is simultaneously brought into contact with a different pad.

Another embodiment of the pad spring according to the present invention is described hereinafter with reference to FIGS. 7 to 10. FIG. 7 shows a pad spring 40 accommodated in a cassette half 41, and the details of the pad spring 40 will be explained with reference to FIGS. 8a and 8b. The shape of the pad spring 40 is not greatly changed from a conventional one, but a coupling portion 42a, of a center portion 42 bent into a convex shape, is made narrow and almost encloses a center capstan shaft hole 43.

Further, at ends of free end portions 44a, 44b, which extend from the center portion 42 and project into the cassette half 41, are adhered pads 45a, 45b, respectively.

Further, in the vicinity of the base of the free ends, 44a, 44b of the pad spring 40, i.e., very close to the center portion 42, are provided round projections 46a, 46b as a working fulcrum in the rear of the pads 45a, 45b.

It is a matter of course that the cassette half 41 for housing the pad spring 40 is provided with projection supporting members 47a, 47b to provide a fixing side for the working fulcrum.

When the projections 46a, 46b forming the working fulcrum of the pad spring 40 are provided in the rear of the free ends 44a, 44b, the distance from the pads 45a, 45b becomes very short and as a result, the pad is well matched with the head.

Figure 6A:
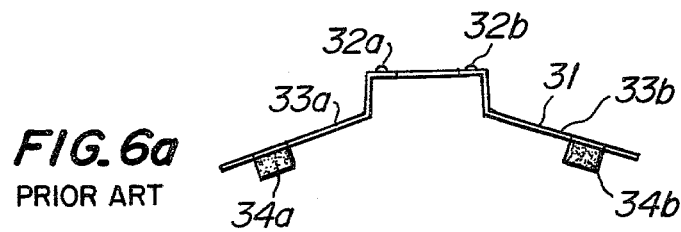
FIGS. 6a, 6b, 6c and 6d are a side view, a front view, and views for exptaining the operation illustrating the conventional pad spring shown in FIG. 1.
Figure 6B:
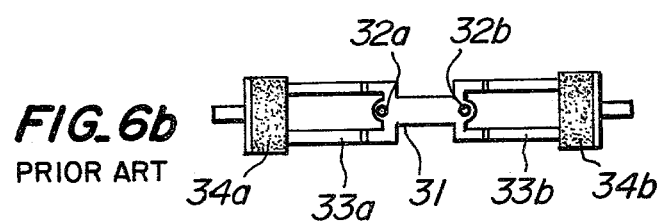
Figure 6C:
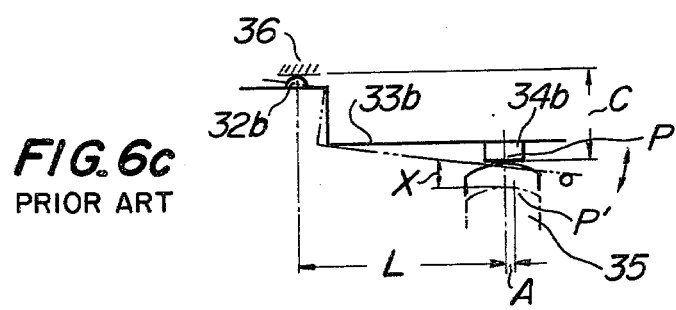

That is, by referring to FIGS. 9 and 10, the operational state of the pad and the head will be explained. In FIG. 6c is explained the distance between the conventional pad and the head, but when comparing with reference to FIG. 6c, a distance L along the pad spring, when the projections forming the working fulcrum and the pad become operative, and a distance X allowed for making the head contact with the pad are made constant, respectively. When setting as described above, distances C and C', when the projection and the pad become operative, follow a relation of C>C', so that contact points P',Q' of the pad and the head are moved to P, Q, respectively. As a result, the moving amount thereof becomes A>B. If the moving amount is large, there occurs such problems that noise or the like is generated when recording, spring force becomes unstable or the like, so that it is preferable to make the moving amount as small as possible. Particularly, there is the possibility that a switching noise at the time of starting will be recorded with a width in accordance with the moving amount of the magnetic tape.

Figure 6D:
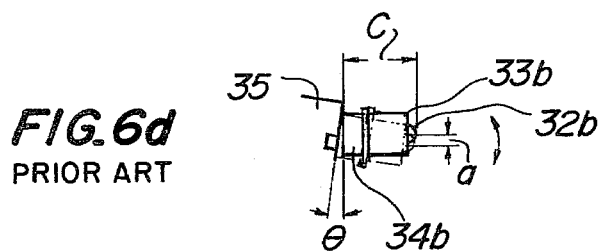

In the same manner, FIG. 6d is compared with FIG. 10. As to the positional displacement in the vertical direction to the paper surface, if a contact angle θ of the head with the pad is made constant, it becomes C>C', so that the moving angle becomes a>b, and the head is well matched with the pad.

As described above, according to the present invention, the projection forming a working fulcrum is arranged very close to the rear surface of the pad, so that the amount of movement of the pad spring at the time of head contact is very small, the head is well matched with the pad. The head shifting movement when contacting with the pad is very small, and as a result, any cause of a noise can be mitigated with a simple construction.

What is claimed is:

1. A pad spring for use in a tape cassette to press a magnetic tape in the cassette against a magnetic head which enters the cassette, the cassette including a pair of fulcrum supporting members, said pad spring comprising a generally U-shaped center portion and a pad supporting portion joined to said center portion at each free end thereof to form a generally elongated spring body, each said pad supporting portion including a substantially flat, free end section fixed to a different one of free ends of said center portion and extending in the long direction of said spring body away from said center portion, a pair of pads each secured to a different one of said free end sections on the surfaces of said free end sections which face toward the magnetic head, and a projection formed on the surface of each of said free end sections which surface faces toward the fulcrum supporting members in the cassette for contacting the fulcrum supporting members to provide a working fulcrum for each of said free end sections when the magnetic head is inserted into the cassette to contact one side of the tape and said pads contact the other side of the tape to press the tape against the magnetic head.

2. A pad spring as claimed in claim 1, wherein each of said free end sections comprises a square frame portion and a narrow free end portion having said pad thereon.

3. A pad spring as claimed in claim 1, wherein each of said free end sections comprises a square frame portion having said pad thereon.

* * * * *